(12) United States Patent
Lamar et al.

(10) Patent No.: US 12,703,629 B2
(45) Date of Patent: Aug. 11, 2026

(54) STABLE QUALIFIED CLEAN HYDROGEN PRODUCTION PROCESS AND SYSTEM

(71) Applicant: Black & Veatch Holding Company, Overland Park, KS (US)

(72) Inventors: Justin Lamar, Overland Park, KS (US); James Kurr, Overland Park, KS (US)

(73) Assignee: BLACK & VEATCH CORPORATION, Overland Park, KS (US)

( * ) Notice: Subject to any disclaimer, the term of this patent is extended or adjusted under 35 U.S.C. 154(b) by 0 days.

(21) Appl. No.: 19/019,717

(22) Filed: Jan. 14, 2025

(65) Prior Publication Data

US 2025/0230044 A1 Jul. 17, 2025

Related U.S. Application Data

(60) Provisional application No. 63/620,965, filed on Jan. 15, 2024.

(51) Int. Cl.

| | |
|---|---|
| ***C01B 3/382*** | (2026.01) |
| ***B01D 53/14*** | (2006.01) |
| ***B01D 53/26*** | (2006.01) |
| ***B01D 53/28*** | (2006.01) |
| ***C01B 3/48*** | (2006.01) |

(52) U.S. Cl.

CPC .......... *C01B 3/382* (2013.01); *B01D 53/1425* (2013.01); *B01D 53/1493* (2013.01); *B01D 53/263* (2013.01); *B01D 53/28* (2013.01); *C01B 3/48* (2013.01); *B01D 2256/245* (2013.01); *B01D 2257/80* (2013.01); *C01B 2203/0233* (2013.01); *C01B 2203/0283* (2013.01); *C01B 2203/0822* (2013.01); *C01B 2203/085* (2013.01); *C01B 2203/1241* (2013.01); *C01B 2203/86* (2013.01)

(58) Field of Classification Search

CPC ........................................................ C01B 3/382

See application file for complete search history.

(56) References Cited

U.S. PATENT DOCUMENTS

| | | | | |
|---|---|---|---|---|
| 4,421,535 A * | 12/1983 | Mehra | ...................... | C10G 5/04<br>62/938 |
| 5,746,985 A * | 5/1998 | Takahashi | ........... | H01M 8/0631<br>422/177 |

(Continued)

FOREIGN PATENT DOCUMENTS

WO WO2017096337 A1 6/2017

OTHER PUBLICATIONS

International Search Report and Written Opinion in related PCT Application PCT/US2025/011639 mailed May 2, 2025, 10 pages.

*Primary Examiner* — Paul A Wartalowicz

(74) *Attorney, Agent, or Firm* — HOVEY WILLIAMS LLP

(57) ABSTRACT

A facility and methods to produce blue hydrogen with low carbon intensity scores. The facility and methods combine technologies to synthesize methane into qualified clean hydrogen (QCH) with low carbon intensity scores by mitigating CO2 emissions from upstream gas well gathering systems as well as midstream hydrogen production systems, employing hydrogen powered gas turbines to mitigate use of grid power, and leveraging CO2 capture technologies.

19 Claims, 3 Drawing Sheets

(56) References Cited

U.S. PATENT DOCUMENTS

| | | | | |
|---|---|---|---|---|
| 8,301,359 | B1 * | 10/2012 | Sagar | G05B 19/042<br>123/1 A |
| 10,954,449 | B2 | 3/2021 | Cohn et al. | |
| 11,642,620 | B2 | 5/2023 | Arkadakskiy et al. | |
| 2010/0080754 | A1 | 4/2010 | Fischer et al. | |
| 2011/0237839 | A1 | 9/2011 | Waldstein | |
| 2013/0008175 | A1 | 1/2013 | Mckenna | |
| 2014/0336420 | A1 * | 11/2014 | Iijima | C10G 3/42<br>422/162 |
| 2018/0215618 | A1 * | 8/2018 | Kang | C01B 3/48 |
| 2019/0077659 | A1 * | 3/2019 | Humblot | C01B 3/323 |
| 2019/0262766 | A1 * | 8/2019 | Oyelakin | C10L 3/104 |
| 2019/0284488 | A1 * | 9/2019 | Frey | C10G 65/12 |
| 2022/0065161 | A1 | 3/2022 | Van Der Walt et al. | |
| 2022/0090539 | A1 | 3/2022 | Krishnamurthy et al. | |
| 2022/0251935 | A1 * | 8/2022 | Vinegar | E21B 43/2605 |
| 2022/0306465 | A1 | 9/2022 | Arora | |
| 2022/0396479 | A1 | 12/2022 | Yurchenko | |
| 2023/0061251 | A1 | 3/2023 | Cappello et al. | |
| 2023/0357004 | A1 | 11/2023 | Vuksan | |
| 2023/0383624 | A1 | 11/2023 | Heiskell et al. | |
| 2023/0391616 | A1 | 12/2023 | Johnson | |

* cited by examiner

STABLE QUALIFIED CLEAN HYDROGEN PRODUCTION PROCESS AND SYSTEM

CROSS-REFERENCE TO RELATED APPLICATIONS

The current patent application is a non-provisional utility patent application which claims priority benefit, with regard to all common subject matter, of earlier-filed U.S. Provisional Application Ser. No. 63/620,965; titled "STABLE QUALIFIED CLEAN HYDROGEN PRODUCTION PROCESS AND SYSTEM"; and filed Jan. 15, 2024. The Provisional application is hereby incorporated by reference, in its entirety, into the current patent application.

BACKGROUND OF THE INVENTION

Hydrogen is a versatile and clean fuel that has the potential to play a significant role in the transition to a low-carbon energy system. As a fuel, hydrogen can be used to generate electricity, produce heat, and power vehicles, offering a wide range of applications and benefits. Hydrogen can also be used as a feedstock for various industrial processes, including the production of chemicals, refining petroleum, and manufacturing materials like steel. By substituting hydrogen for fossil fuels in these applications, emissions can be reduced significantly.

One of the primary advantages of hydrogen is its environmental friendliness. When hydrogen is burned or used in a fuel cell, the only byproduct is water vapor, making it a zero-emission fuel. This makes hydrogen an attractive alternative to fossil fuels, which release greenhouse gases and contribute to climate change.

Hydrogen can be produced through various methods. In the energy industry, hydrogen is often referred to by various colors, including blue hydrogen and green hydrogen, as shorthand for how it is created.

Blue hydrogen is produced through a process called steam methane reforming (SMR), which involves the use of natural gas as a feedstock. In this process, natural gas is heated with steam, resulting in a chemical reaction that produces hydrogen and carbon dioxide. The carbon dioxide emitted during this process is then captured and stored underground (carbon capture and storage or CCS) to prevent it from entering the atmosphere. Carbon capture and storage makes blue hydrogen a lower-emission alternative to traditional hydrogen production methods, as it reduces the release of greenhouse gases. However, blue hydrogen still relies on fossil fuels and does not eliminate carbon emissions completely.

Green hydrogen is produced through a process called electrolysis, which uses electricity to split water molecules into hydrogen and oxygen. The required electricity is generated from renewable sources such as solar or wind power, making green hydrogen a zero-emission fuel. The production of green hydrogen does not release any carbon dioxide or other greenhouse gases, and the only byproduct is oxygen. As a result, green hydrogen is often seen as a more sustainable and environmentally friendly option compared to blue hydrogen.

The main drawback of green hydrogen is its expense. Making hydrogen from natural gas (blue hydrogen) is estimated to cost $1.50 per kilogram, and making hydrogen with electrolysis (green hydrogen) is estimated to cost $5 per kilogram. Green hydrogen is also less reliable because renewable energy sources are not always available.

To promote the production and use of clean hydrogen, the Inflation Reduction Act includes a clean hydrogen tax credit. Under this tax credit, eligible taxpayers can claim a credit for each kilogram of qualified clean hydrogen produced, sold, or used as a fuel.

To qualify for this tax credit, the hydrogen must meet certain criteria, including having a carbon Intensity score of less than 0.45. A carbon intensity score is a measurement that quantifies the amount of carbon dioxide (CO2) emissions produced per unit of energy or economic output. The score is typically expressed as the amount of CO2 emitted per kilowatt-hour (kWh) of electricity generated. A lower carbon intensity score indicates a more environmentally friendly energy source or activity, as it implies lower CO2 emissions.

Renewable energy sources such as solar and wind power generally have low or zero carbon intensity scores because they do not release CO2 during the generation of electricity. On the other hand, fossil fuel-based energy sources like coal and natural gas tend to have higher carbon intensity scores due to the significant amount of CO2 released when they are burned. Thus, it is commonly believed that only green hydrogen, which is generated with renewable energy sources, qualifies for the clean hydrogen tax credit. But as mentioned above, green hydrogen is more expensive than blue hydrogen and not as stable because of the intermittent nature of renewable energy.

SUMMARY OF THE INVENTION

The present invention solves the above-described problems and provides a distinct advance in the art of hydrogen production by providing a facility and methods to produce blue hydrogen with a carbon intensity score of 0.45 or lower to thus qualify for clean hydrogen tax credits.

Embodiments of the invention combine various technologies to synthesize methane into qualified clean hydrogen (QCH) with a greenhouse gases, regulated emissions, and energy use in transportation (GREET) carbon intensity score less than 0.45. The invention mitigates CO2 from upstream gas well gathering systems as well as midstream hydrogen production systems, uses hydrogen powered gas turbines to mitigate use of grid power, and leverages CO2 capture technologies.

Upstream emission mitigating steps include:

1. Converting individual well GPU heaters to electric.
2. Converting individual well GPU control valves/equipment to solar-electric operation.
3. Capturing the dehydrator flash tank off-gas and route to an on-site process or utilize for the dehydrator burner.
4. Implementing smart controls for the dehydrator burners to reduce burner usage.
5. Converting the GPU and dehydrator burners to operate with hydrogen gas instead of natural gas.

Midstream CO2 emissions mitigating steps include:

1. Minimizing non-hydrogen fuel from fired heaters.
2. Sequestering all captured CO2 associated with QCH in on-site Class VI wells.
3. Using a gas combustion turbine fired with 100% hydrogen in combined cycle mode to generate clean electricity, to minimize input grid power during normal operation.
4. Using hot gas expansion turbine power from inlet natural gas: the electrical power generated from the inlet natural gas expansion turbine.
5. Using steam turbine power from process waste heat: the electrical power generated by the steam turbine set in the syn gas production plant from superheated high-pressure steam received from the fired steam super-heater.

The present invention can be used in various applications, including producing qualified clean hydrogen for ammonia for energy; producing qualified clean hydrogen for use as a fuel; producing qualified clean hydrogen for industrial production applications; and producing qualified clean hydrogen for syngas.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF DRAWINGS

Embodiments of the current invention are described in detail below with reference to the attached drawing figures, wherein.

Figures 1, 2:
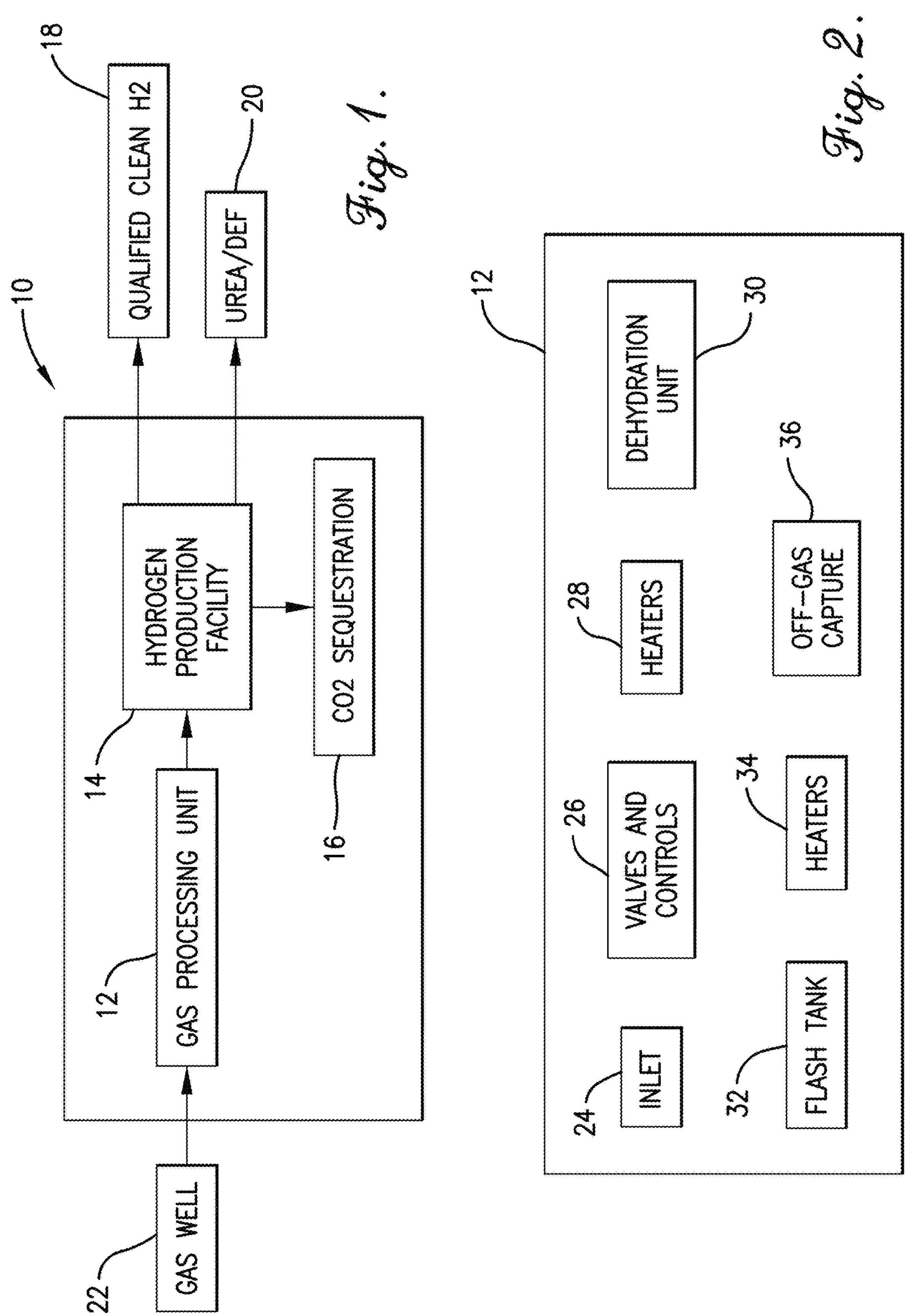
FIG. 1 is a block diagram of exemplary components of a facility for producing low carbon intensity hydrogen from methane.
FIG. 2 is a block diagram of exemplary components of a gas production unit.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE INVENTION

Turning now to the drawing figures, and initially FIG. 1, an exemplary facility 10 for producing low carbon intensity hydrogen from methane is depicted. An embodiment of the facility 10 broadly comprises a gas processing unit 12, a hydrogen production facility, and carbon capture and storage mechanisms 16. The individual components of the facility 10 may be at the same site or may be dispersed at different sites and connected via pipelines and other gas or liquid carrying conduits. As described below, embodiments of the facility 10 may be used to implement processes to produce blue hydrogen 18 with a carbon intensity score of 0.45 or lower to thus qualify for clean hydrogen tax credits. The facility may also produce urea 20 for use as diesel exhaust fluid (DEF). The facility may be sized and configured to produce any amount of hydrogen, urea, and other substances, that can be used for any purposes such as fuel, fertilizer, industrial production, etc.

The gas processing unit 12 receives raw methane from a gas well 22 and removes impurities such as moisture, oil, and acidic gases and otherwise conditions the methane before it is passed to the hydrogen production facility 14. Gas processing units are well known in the art, so only components of the gas processing unit 12 that are relevant to the principles of the present invention will be described herein.

Components of the gas processing unit 12 constructed in accordance with embodiments of the invention are shown in FIG. 2. The gas processing unit 12 comprises an inlet for receiving methane extracted from the gas well 22. The inlet may include many conventional components including the valves 26 discussed below.

The gas processing unit 12 also comprises a number of electrically powered heaters 28 for heating the methane extracted from the well. These heaters may be used in various stages of the gas processing unit, including separation, compression, and transportation and for several purposes including to prevent hydrate formation, to prevent freezing at the wellhead, to maintain the temperature of the methane as it travels through pipelines, and for heating areas where gas is processed and refined. By keeping the methane at a suitable temperature, these heaters 28 help ensure that the physical properties of the methane remain stable during extraction, processing, and transportation. In accordance with an important aspect of the present invention, these heaters 28 are powered with electricity generated by the generators 42, 52 described below or with electricity generated from renewable energy sources.

The gas processing unit 12 also includes a number of electrically powered valves 26 and related controls for controlling the flow of the methane to, though, and from the gas processing unit. In accordance with an important aspect of the present invention, these valves and related controls are electrically powered with electricity generated by the generators 42, 52 described herein or with electricity generated from renewable energy sources, and the controls are optimized to minimize operation of the heaters 28 to conserve electricity and reduce related emissions.

The gas processing unit 12 also includes one or more dehydrators 30. Natural gas often contains water vapor that must be removed to ensure safe and efficient transportation and processing. Dehydration is typically achieved using a glycol dehydration unit, where a liquid glycol (commonly triethylene glycol or TEG) is used to absorb water from the gas stream. The glycol, once it has absorbed moisture, must then be regenerated to maintain its effectiveness. Thus, the dehydrators 30 may comprise a glycol dehydration unit for dehydrating methane with glycol to remove water vapor.

The gas processing unit 12 also includes a flash tank 32 for removing absorbed moisture from the glycol so that the glycol may be re-used. The flash tank is a vessel in which the glycol solution (containing absorbed water) is heated to facilitate the removal of water vapor from the glycol. When the glycol is heated, the absorbed water, along with some volatile organic compounds (VOCs) and other light hydrocarbons, vaporizes and is released. As the heated glycol enters the flash tank 32, the reduction in pressure allows the dissolved gases (mainly water vapor, but also other hydrocarbons) to "flash off" or evaporate quickly. The flash tank 32 separates the vapor (off-gas) from the liquid glycol, which is then cooled and reused in the dehydration process.

In accordance with an important aspect of the invention, the gas processing unit 12 also includes one or more hydrogen powered heater to heat the glycol and absorbed moisture in the flash tank. The hydrogen powered heaters 34 operate on hydrogen produced by the facility rather than natural gas or other fossil fuels.

The gas processing unit 12 also comprises off-gas capturing mechanism 36 for capturing off-gas from the flash tank 32. In accordance with an important aspect of the present invention, these captured off-gases are sequestered or otherwise neutralized to limit emissions from the flash tank 32 rather than flaring (burning) the off-gases.

Figure 3:
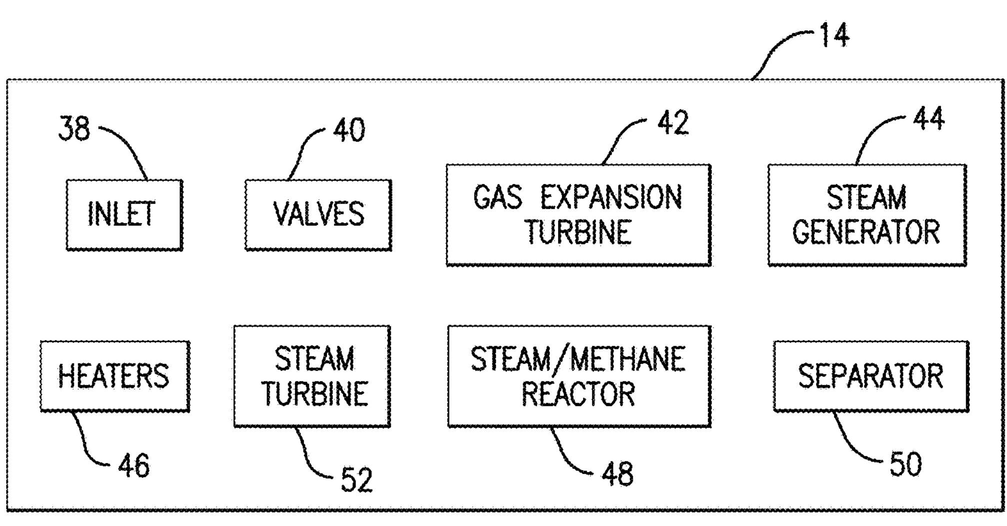
FIG. 3 is a block diagram of exemplary components of a hydrogen production facility.

The hydrogen production facility 14 will now be described with reference to FIG. 3. The facility 14 receives purified methane from the gas processing unit 12 and converts it to hydrogen, ammonia, and/or other substances via steam methane reforming, a process in which methane is mixed with hot steam in the presence of a catalyst, creating hydrogen and carbon dioxide. Hydrogen production facilities are well known in the art, so only components of the facility 14 that are relevant to the principles of the present invention will be described herein.

An embodiment of the hydrogen production facility 14 comprises an inlet 38 for receiving purified methane from the gas processing unit. The hydrogen production facility also includes a number of electrically powered valves 40 and related controls for controlling the flow of the methane, hydrogen, ammonia, and other products to, though, and from the facility 14. In accordance with an important aspect of the present invention, these valves and related controls are powered with electricity generated by the generators 42, 52 described herein or with electricity generated from renewable energy sources.

In accordance with an important aspect of the present invention, the hydrogen production facility also comprises a gas expansion turbine 42 for generating electricity from expansion of the methane at the inlet 38. Methane delivered to the inlet 38 is pressurized by the gas processing unit 12 to increase flow rates to the hydrogen production facility. The expansion turbine 42 extracts energy from the high-pressure methane as it expands to a lower pressure to generate electricity. Specifically, as pressurized methane flows through the turbine, it powers the turbine to create electricity. The electricity may be used to power components of the hydrogen production facility as described above or delivered to an electric grid. The pressure drop of the methane in the turbine can also be beneficial for downstream processes.

As summarized above, the hydrogen production facility 14 produces hydrogen from methane via steam methane reforming. Stream methane reforming (SMR) produces hydrogen gas from methane, which is the primary component of natural gas. The process involves reacting methane with steam (water vapor) at high temperatures (typically 700-1,000° C.) in the presence of a catalyst, usually nickel-based. Two main chemical reactions occur. The first reaction converts methane and steam into carbon monoxide (CO) and hydrogen ($H_2$), while the second reaction converts carbon monoxide and more steam into additional hydrogen and carbon dioxide ($CO_2$). After the reforming reactions, the resulting gas mixture contains hydrogen, carbon monoxide, carbon dioxide, and unreacted steam. To obtain pure hydrogen, various separation techniques are employed, such as pressure swing adsorption (PSA), where hydrogen is separated from other gases based on differences in adsorption properties.

To enable the above-described steam methane reforming, the hydrogen production facility 14 comprises a steam generator 44 for generating team; one or more hydrogen powered heaters 46 for heating the steam generator; a reactor 48 for reacting the methane with the steam in the presence of a catalyst to convert the methane and steam into hydrogen and carbon monoxide; and a separator for separating the hydrogen from the carbon dioxide. Importantly, the heaters 46 are hydrogen powered rather than natural gas fired heaters.

In accordance with an important aspect of the present invention, the hydrogen production facility 14 also comprises a steam turbine 52 for generating electricity from waste heat from the heaters 46 and/or the steam generator 44. The electricity may be used to power components of the hydrogen production facility as described above or delivered to an electric grid.

In accordance with another important aspect of the present invention, the facility 10 also comprises or employs carbon capture and storage mechanisms 16 for sequestering and storing the carbon dioxide from the steam methane reforming process. The carbon capture mechanisms 16 receive, store, and sequester CO2 from the hydrogen production facility in on-site Class VI wells. Exemplary mechanisms that may be used with the present invention include Topsoe™ SynCOR™ carbon capture technologies.

Figure 4:
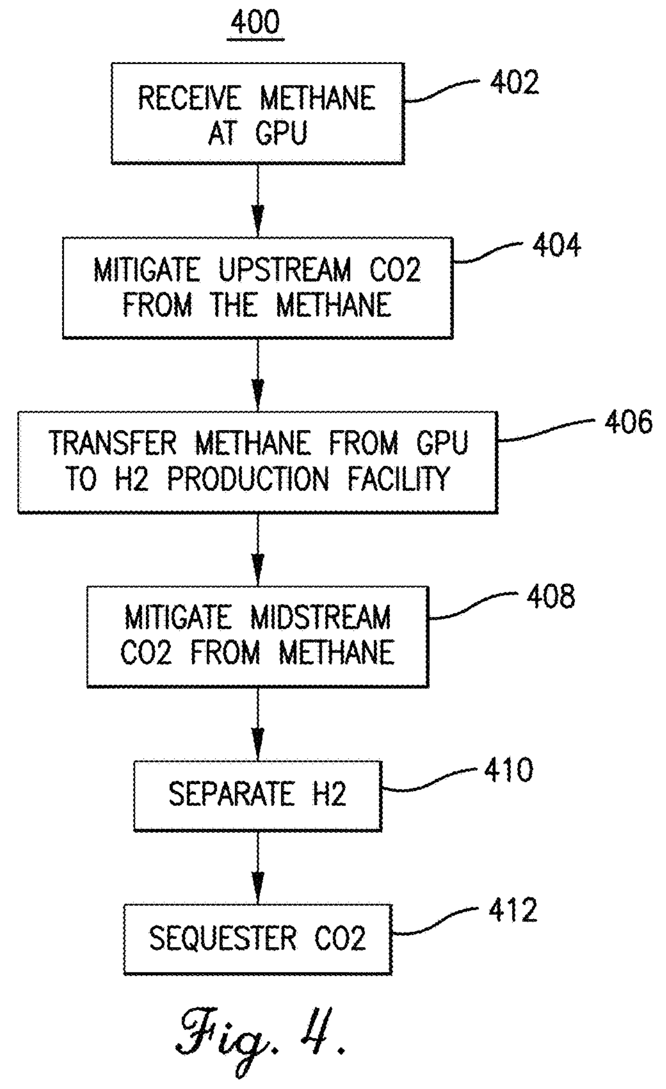
FIG. 4 is a flow diagram depicting exemplary steps of a method for producing low carbon intensity hydrogen from methane.

The flow chart of FIG. 4 shows exemplary steps in method 400 of the present invention. In some alternative implementations, the functions noted in the various blocks may occur out of the order depicted in FIG. 4. For example, two blocks shown in succession in FIG. 4 may in fact be executed substantially concurrently, or the blocks may sometimes be executed in the reverse order depending upon the functionality involved.

The method 400 and the method 500 discussed below may be implemented with the facility 10 described above or similar facilities. The method 400 produces low carbon intensity hydrogen from methane and includes receiving at a gas processing unit 12 methane extracted from a well 22 as depicted in block 402.

The method 400 further compromises mitigating upstream CO2 from the methane in the gas processing unit as depicted by block 404. The mitigating step may include all or some of the following: employing electrically powered heaters in the gas processing unit, employing electrically powered valves in the gas processing unit, employing electrically powered controls in the gas processing unit, and/or employing hydrogen-powered heaters in the gas processing unit.

The method further comprises transferring the methane from the gas processing unit 12 to a hydrogen production facility 14 as depicted in block 406 and mitigating midstream CO2 from the methane in the hydrogen production facility as depicted in block 408. The mitigating step may include all or some of the following: generating electricity from delivery of the methane to the hydrogen production facility, employing hydrogen powered heaters at the hydrogen production facility, and generating electricity from waste heat.

The method also comprises separating hydrogen via steam methane reforming as depicted in the block 410 and storing CO2 separated from the hydrogen underground with carbon capture and storage technologies as depicted in block 412.

Figure 5:
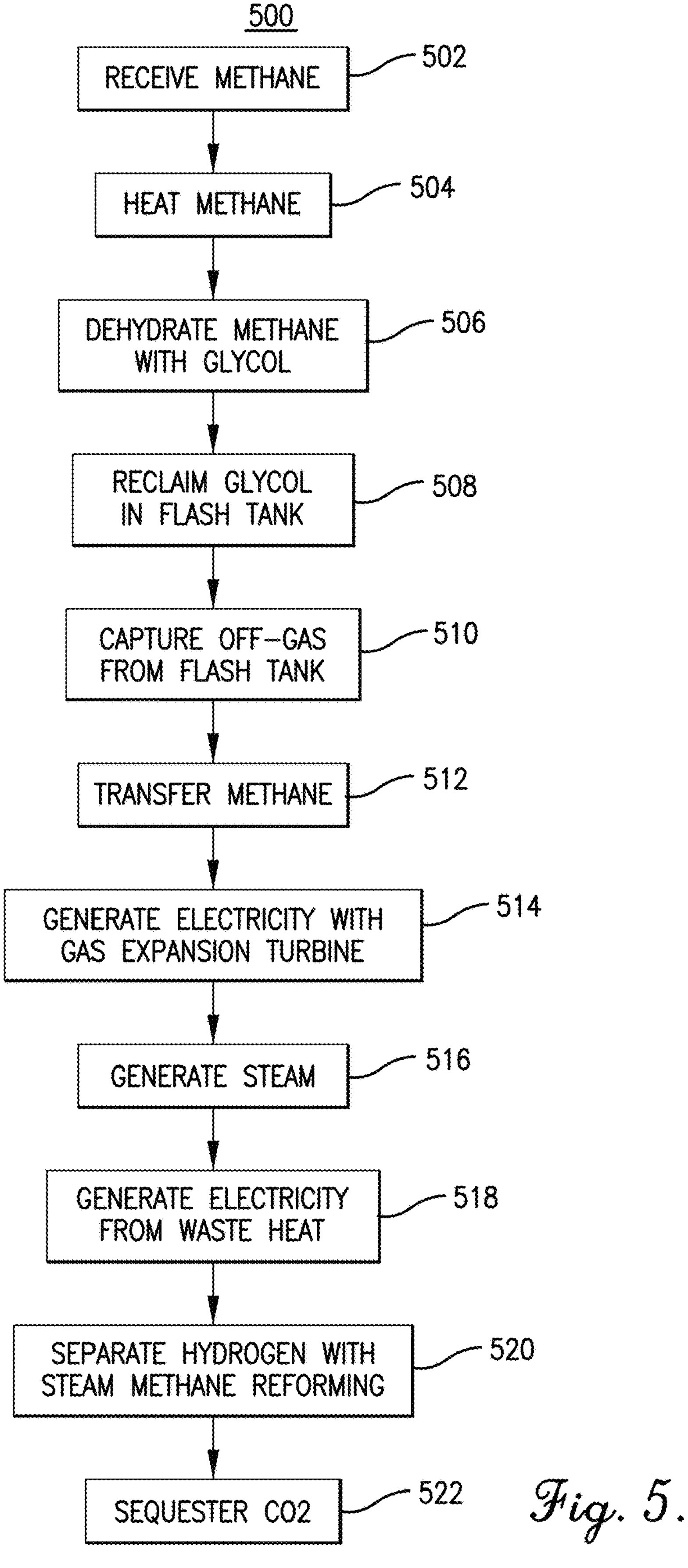
FIG. 5 is a flow diagram depicting exemplary steps of another method for producing low carbon intensity hydrogen from methane.

The flow chart of FIG. 5 shows exemplary steps in another method 500 of the present invention. In some alternative implementations, the functions noted in the various blocks may occur out of the order depicted in FIG. 5. For example, two blocks shown in succession in FIG. 5 may in fact be executed substantially concurrently, or the blocks may sometimes be executed in the reverse order depending upon the functionality involved.

The method 500 and the method 400 discussed above may be implemented with the facility 10 described above or similar facilities. The method 500 produces low carbon intensity hydrogen from methane and includes receiving at a gas processing unit 12 methane extracted from a well as depicted in block 502.

The method further comprises heating the methane with electrically powered heaters in the gas processing unit as depicted in block 504. The method further comprises controlling the flow of the methane in the gas processing unit with electrically powered valves.

The method further comprises dehydrating the methane in a glycol dehydration unit with glycol to remove water vapor as depicted in block 506.

The method further comprises reclaiming the glycol by transferring the glycol and absorbed moisture from the glycol to a flash tank as depicted in block 508.

The method further comprises heating the glycol and absorbed moisture in the flash tank with a hydrogen powered heater to remove the absorbed moisture from the glycol also as generally depicted in block 508.

The method further comprises capturing off-gas from the flash tank as depicted in block 510.

The method further comprises transferring the methane to a hydrogen production facility 14 as depicted in block 512.

The method further comprises generating electricity from expansion of the methane at the hydrogen production facility with a gas expansion turbine as depicted in block 514.

The method further comprises heating water with a hydrogen powered heater to create steam as depicted in block 516.

The method further comprises generating electricity from waste heat from the hydrogen powered heater with a steam turbine as depicted in block 518.

The method further comprises reacting the methane with the steam in the presence of a catalyst to convert the methane and steam into hydrogen and carbon monoxide as depicted in block 520.

The method further comprises adding additional water to the hydrogen and carbon monoxide to create more hydrogen and carbon dioxide also as generally depicted in block 520.

The method further comprises separating the hydrogen from the carbon dioxide and storing the hydrogen for later use also as generally depicted in block 520.

The method further comprises storing the carbon dioxide underground with carbon capture and storage technologies as depicted in block 522.

Examples of the carbon intensity scores of hydrogen produced with the facility and methods of the present invention are shown in the related provisional patent application, and these examples are incorporated into the present application in their entireties.

ADDITIONAL CONSIDERATIONS

In this description, references to “one embodiment,” “an embodiment,” or “embodiments” mean that the feature or features being referred to are included in at least one embodiment of the technology. Separate references to “one embodiment,” “an embodiment,” or “embodiments” in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein, the terms “comprises,” “comprising,” “includes,” “including,” “has,” “having” or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of any subsequently filed patent applications are not intended to be construed under 35 U.S.C. § 112 (f) unless traditional means-plus-function language is expressly recited, such as “means for” or “step for” language being explicitly recited in the claim(s).

Although the invention has been described with reference to the embodiments illustrated in the attached drawing figures, it is noted that equivalents may be employed and substitutions made herein without departing from the scope of the invention as recited in the claims.

The invention claimed is:

1. A method of producing low carbon intensity hydrogen from methane, the method comprising:

receiving at a gas processing unit methane extracted from a well;

mitigating upstream CO2 emissions in the gas processing unit by:

employing electrically powered heaters in the gas processing unit to heat the methane before it is transferred from the gas processing unit, employing electrically powered valves in the gas processing unit, employing electrically powered controls in the gas processing unit, and employing hydrogen-powered heaters in the gas processing unit to heat at least one component in the gas processing unit;

transferring the methane from the gas processing unit to a hydrogen production facility;

processing the methane in the hydrogen production facility to separate hydrogen and CO2 from the methane;

mitigating midstream CO2 emissions in the hydrogen production facility by:

generating electricity from delivery of the methane to the hydrogen production facility, employing hydrogen powered heaters in the hydrogen production facility, generating electricity from waste heat; and storing CO2 separated from hydrogen underground.

2. The method of claim 1, wherein the electrically powered valves in the mitigating upstream CO2 step are used to control the flow of the methane in the gas processing unit.

3. The method of claim 1, wherein the mitigating upstream CO2 step further comprises capturing off-gas from a flash tank.

4. The method of claim 1, wherein the generating electricity from delivery of the methane to the hydrogen production facility step comprises generating electricity from expansion of the methane after it is transferred to the hydrogen production facility with a gas expansion turbine.

5. The method of claim 1, wherein the hydrogen powered heaters in the mitigating midstream CO2 step are used to create steam to be added to the methane.

6. The method of claim 1, wherein the generating electricity from waste heat step comprises generating electricity from waste heat from the hydrogen powered heaters with a steam turbine.

7. The method of claim 1, further comprising transferring the hydrogen to a fuel processing plant to process the hydrogen into a vehicle fuel.

8. The method of claim 1, further comprising transferring the hydrogen to an electricity generating station to power a hydrogen-fired generator to generate electricity.

9. The method of claim 1, wherein the hydrogen produced by the method has a carbon intensity score of less than 0.45.

10. The method of claim 1, wherein the hydrogen produced by the method has a carbon intensity score of less than 0.2.

11. A method of producing low carbon intensity hydrogen from methane, the method comprising:

receiving at a gas processing unit methane extracted from a well;

heating the methane with electrically powered heaters in the gas processing unit;

controlling the flow of the methane in the gas processing unit with electrically powered valves;

dehydrating the methane in a glycol dehydration unit with glycol to remove water vapor;

reclaiming the glycol by transferring the glycol and absorbed moisture from the glycol dehydration unit to a flash tank;

heating the glycol and absorbed moisture in the flash tank with a hydrogen powered heater to remove the absorbed moisture from the glycol;

capturing off-gas from the flash tank;

transferring the methane to a hydrogen production facility;

generating electricity from expansion of the methane at the hydrogen production facility with a gas expansion turbine;

heating water with a hydrogen powered heater to create steam;

generating electricity from waste heat from the hydrogen powered heater with a steam turbine;

reacting the methane with the steam in the presence of a catalyst to convert the methane and steam into hydrogen and carbon monoxide;

adding additional water to the hydrogen and carbon monoxide to create more hydrogen and carbon dioxide;

separating the hydrogen from the carbon dioxide;

storing the hydrogen for later use; and storing the carbon dioxide underground with carbon capture and storage technologies.

12. The method of claim 11, further comprising transferring the hydrogen to a fuel processing plant to process the hydrogen into a vehicle fuel source.

13. The method of claim 11, further comprising transferring the hydrogen to an electricity generating station to power a hydrogen-fired generator to create electricity.

14. The method of claim 11, wherein the hydrogen produced by the method has a carbon intensity score of less than 0.45.

15. The method of claim 11, wherein the hydrogen produced by the method has a carbon intensity score of less than 2.

16. A method of producing hydrogen with a carbon intensity score of less than 0.45 from methane, the method comprising:

receiving at a gas processing unit methane extracted from a well;

mitigating upstream CO2 emissions in the gas processing unit by:

employing electrically powered heaters in the gas processing unit to heat the methane before it is transferred from the gas processing unit, employing electrically powered valves in the gas processing unit, employing electrically powered controls in the gas processing unit, and employing hydrogen-powered heaters in the gas processing unit to heat a flash tank;

transferring the methane from the gas processing unit to a hydrogen production facility;

processing the methane in the hydrogen production facility to separate hydrogen and CO2 from the methane;

mitigating midstream CO2 emissions in the hydrogen production facility by:

generating electricity from expansion of the methane after it is transferred to the hydrogen production facility with a gas expansion turbine, generating steam with a steam generator;

employing hydrogen powered heaters to heat the steam generator;

generating electricity from waste heat from the hydrogen powered heaters with a steam turbine; and storing CO2 separated from hydrogen underground.

17. A method of producing low carbon intensity hydrogen from methane, the method comprising:

receiving at a gas processing unit methane extracted from a well;

heating the methane before it is transferred from the gas processing unit with hydrogen-powered heaters;

transferring the heated methane from the gas processing unit to a hydrogen production facility;

generating electricity from delivery of the methane to the hydrogen production facility;

processing the methane in the hydrogen production facility to separate hydrogen and CO2 from the methane;

storing at least some of the CO2 separated from the hydrogen underground; and transferring some of the hydrogen separated from the methane in the hydrogen production facility back to the gas processing unit to be used as fuel in the hydrogen-powered heaters in the gas processing unit.

18. The method of claim 17, wherein the generating electricity from delivery of the methane to the hydrogen production facility step comprises generating electricity from expansion of the methane with a gas expansion turbine.

19. The method of claim 17, further comprising heating a portion of the hydrogen produced in the hydrogen production facility with waste heat generated by the hydrogen production facility, and transferring the heated hydrogen through a power recovery turbine to product electricity with the power recovery turbine.

* * * * *